United States Patent
Kim

(10) Patent No.: US 9,503,009 B2
(45) Date of Patent: Nov. 22, 2016

(54) METHOD AND APPARATUS FOR CONTROLLING OF 3-PHASE AC MOTOR

(71) Applicant: HYUNDAI MOBIS CO., LTD., Seoul (KR)

(72) Inventor: Sang-Min Kim, Seongnam-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 255 days.

(21) Appl. No.: 14/249,076

(22) Filed: Apr. 9, 2014

(65) Prior Publication Data

US 2015/0188471 A1  Jul. 2, 2015

(30) Foreign Application Priority Data

Dec. 31, 2013 (KR) .......................... 10-2013-0168238

(51) Int. Cl.
 *H02P 21/00* (2016.01)

(52) U.S. Cl.
 CPC ........... *H02P 21/0035* (2013.01); *H02P 21/22* (2016.02); *H02P 29/032* (2016.02); *H02P 25/024* (2016.02); *Y02T 10/7258* (2013.01)

(58) Field of Classification Search
 CPC .. H02P 21/0035; H02P 23/00; H02P 25/021; H02P 29/028
 USPC ..................................................... 318/400.02
 See application file for complete search history.

(56) References Cited

U.S. PATENT DOCUMENTS

| | | | |
|---|---|---|---|
| 6,112,156 A | 8/2000 | Kang | |
| 6,392,418 B1* | 5/2002 | Mir | B62D 5/046 318/716 |
| 2007/0013333 A1* | 1/2007 | Ajima | H02P 6/18 318/432 |
| 2012/0086373 A1 | 4/2012 | Kudanowski et al. | |
| 2013/0063056 A1* | 3/2013 | Takahashi | H02P 27/12 318/400.02 |
| 2014/0091470 A1* | 4/2014 | Sane | H01L 24/32 257/770 |
| 2014/0091740 A1* | 4/2014 | Suzuki | H01L 24/32 257/770 |
| 2014/0091742 A1* | 4/2014 | Suzuki | H02P 29/027 318/400.22 |
| 2014/0091744 A1* | 4/2014 | Suzuki | H02P 6/12 318/400.22 |
| 2014/0145690 A1* | 5/2014 | Lee | G11C 5/147 323/265 |

FOREIGN PATENT DOCUMENTS

| | | |
|---|---|---|
| JP | 2013-110864 A | 6/2013 |
| KR | 10-1998-0015274 A | 5/1998 |
| KR | 10-1091636 B1 | 8/2011 |

* cited by examiner

*Primary Examiner* — Erick Glass
(74) *Attorney, Agent, or Firm* — Knobbe Martens Olson & Bear LLP

(57) ABSTRACT

A method for controlling a 3-phase AC motor may include; transforming a torque command signal of an upper control into a voltage command, generating a current measurement value for a current flowing in two phases of the 3-phase AC motor depending on the voltage command by using a current sensor, generating a current estimation value by using driving sensing information of the 3-phase AC motor depending on the voltage command, calculating a current estimation error by using the current measurement value and the current estimation value, comparing with a preset reference value by using the calculated current estimation error, and performing a state transition changing a driving control type of the 3-phase AC motor depending on the comparison result.

20 Claims, 7 Drawing Sheets

METHOD AND APPARATUS FOR CONTROLLING OF 3-PHASE AC MOTOR

CROSS-REFERENCE TO RELATED APPLICATION

This application claims the benefit of priority to Korean Patent Application No. 10-2013-0168238 filed on Dec. 31, 2013, the entire contents of which are incorporated herein by reference.

TECHNICAL FIELD

Exemplary embodiments of the present invention relate to a control of a 3-phase motor, and more particularly, to a control of a 3-phase brushless AC motor of an environmentally friendly vehicle capable of guaranteeing a normal operation of the 3-phase brushless AC motor when a current sensor of the 3-phase brushless AC motor mounted in a motor-driven electric driving system of the environmentally friendly vehicle is in a fault condition.

BACKGROUND

Generally, to cope with a danger of air pollution and petroleum depletion, related technologies for an environmentally friendly vehicle using electric energy as power of the vehicle has been actively developed. The environmentally friendly vehicle includes a hybrid electric vehicle, a fuel cell electric vehicle, and an electric vehicle.

A vehicle according to the related art uses a hydraulic electric driving system, while the environmentally friendly vehicle including the motor-driven electric driving system is recently being released. The motor-driven electric driving system attaches a 3-phase brushless AC motor (hereinafter, referred to as a BLAC motor) to a steering link part to directly transfer power. The hydraulic electric driving system according to the related art has more reduced performance than the motor-driven electric driving system in view of the improvement in fuel efficiency of the vehicle. Since the motor-driven electric driving system does not use power of an engine at all while performing an operation to assist a steering force for a driver, the motor-driven electric driving system may increase the fuel efficiency of the vehicle as much as 3 to 5%, compared with the hydraulic electric driving system.

Meanwhile, as the motor used in the motor-driven electric driving system, a DC motor or the BLAC motor may be used. The BLAC motor in which components corresponding to a brush and a commutator in the DC motor according to the related art are replaced with a semiconductor switch has been used. According to the related art, to determine whether the BLAC motor is normally operated and controlled, a control state of the BLAC motor is determined by measuring a current flowing in an A-phase line and a B-line line, which are connected between an inverter and the BLAC motor, by each of the current sensors and comparing the measured current values.

FIG. 1 is a schematic diagram illustrating an apparatus for controlling a 3-phase brushless AC motor according to the related art. Referring to FIG. 1, an apparatus 100 for controlling a 3-phase brushless AC motor according to the related art includes a control unit 110, an inverter 120, a current sensor unit 130 (130a and 130b) for control, a current sensor unit 140 (140a and 140b) for monitoring, and a BLAC motor 150.

The inverter 120 controls a driving of the BLAC motor 150 by a vector control mode depending on a received PWM signal. The inverter 120 receives, as a feedback signal, an electrical angular speed signal of a motor rotation angle measured by a rotor speed sensor (not illustrated) included in the BLAC motor 150 at the time of driving the BLAC motor 150 to control a magnetic flux component and a torque component, thereby controlling the driving of the BLAC motor 150.

The current sensor unit 130 (130a and 130b) for control includes a first A-phase current sensor 130a configured to measure a current flowing in an A-phase line connecting between the BLAC motor 150 and the inverter 120 and a first B-phase current sensor 130b configured to measure a current flowing in a B-phase line connecting between the BLAC motor 150 and the inverter 120.

The first A-phase current sensor 130a measures the A-phase current of a motor stator which is the current flowing in the A-phase line to generate a current measurement signal $i_{as1}$ for A-phase control of the stator which represents an A-phase current value of the stator.

The first B-phase current sensor 130b measures the B-phase current of the motor stator which is the current flowing in the B-phase line to generate a current measurement signal $i_{bs1}$ for B-phase control of the stator which represents a B-phase current value of the stator.

The current sensor unit 130 (130a and 130b) for control transfers the current measurement signal $i_{as1}$ for A-phase control of the stator output from the first A-phase current sensor 130a and the current measurement signal $i_{bs1}$ for B-phase control of the stator output from the first B-phase current sensor 130b to a first rotor coordinate system unit 111 which is included in the control unit 110.

The current sensor unit 140 (140a and 140b) for monitoring includes a second A-phase current sensor 140a configured to measure the current flowing in the A-phase line connecting between the BLAC motor 150 and the inverter 120 and a second B-phase current sensor 140b configured to measure the current flowing in the B-phase line connecting between the BLAC motor 150 and the inverter 120.

The second A-phase current sensor 140a measures the A-phase current of the motor stator which is the current flowing in the A-phase line to generate a current measurement signal $i_{as2}$ for A-phase monitoring of the stator which represents the A-phase current value of the stator.

The second B-phase current sensor 140b measures the B-phase current of the motor stator which is the current flowing in the B-phase line to generate a current measurement signal $i_{bs2}$ for B-phase monitoring of the stator which represents the B-phase current value of the stator.

The current sensor unit 140 (140a and 140b) for monitoring transfers the current measurement signal $i_{as2}$ for A-phase monitoring of the stator output from the second A-phase current sensor 140a and the current measurement signal $i_{bs2}$ for B-phase monitoring of the stator output from the second B-phase current sensor 140b to a second rotor coordinate system unit 112 which is included in the control unit 110.

The BLAC motor 150 is driven by controlling the inverter 120.

The control unit 110 is an electronic control unit (hereinafter, referred to as ECU) included in the motor-driven electric driving system which is mounted in the vehicle and controls an operation of each component of the apparatus 100 for controlling a 3-phase brushless AC motor.

The control unit 110 includes a first rotor coordinate system transformation unit 111, a second rotor coordinate system transformation unit 112, and a current sensor abnormality determination unit 113.

The first rotor coordinate system transformation unit 111 performs coordinate transformation on the current measurement signal $i_{as1}$ for A-phase control of the stator and the current measurement signal $i_{bs1}$ for B-phase control of the stator received from the current sensor 130 (130a and 130b) for control to generate a current measurement signal $i^r_{ds1}$ for D-axis control of the rotor coordinate system and transfer the generated current measurement signal $i^r_{ds1}$ for D-axis control to the current sensor abnormality determination unit 113.

Further, the first rotor coordinate system transformation unit 111 performs coordinate transformation on the current measurement signal $i_{as1}$ for A-phase control of the stator and the current measurement signal $i_{bs1}$ for B-phase control of the stator which are received from the current sensor 130 (130a and 130b) for control to generate a current measurement signal $i^r_{qs1}$ for Q-axis control of the rotor coordinate system and transfer the generated current measurement signal $i^r_{qs1}$ for Q-axis control to the current sensor abnormality determination unit 113.

The second rotor coordinate system transformation unit 112 performs coordinate transformation on the current measurement signal $i_{as2}$ for A-phase monitoring of the stator and the current measurement signal $i_{bs2}$ for B-phase monitoring of the stator which are received from the current sensor 140 (140a and 140b) for monitoring to generate a current measurement signal $i^r_{ds2}$ for D-axis monitoring of the rotor coordinate system and transfer the generated current measurement signal $i^r_{ds2}$ for D-axis control to the current sensor abnormality determination unit 113.

Further, the second rotor coordinate system transformation unit 112 performs coordinate transformation on the current measurement signal $i_{as2}$ for A-phase monitoring of the stator and the current measurement signal $i_{bs2}$ for B-phase monitoring of the stator which are received from the current sensor 140 (140a and 140b) for control to generate a current measurement signal $i^r_{qs2}$ for Q-axis monitoring of the rotor coordinate system and transfer the generated current measurement signal $i^r_{qs2}$ for Q-axis monitoring to the current sensor abnormality determination unit 113.

The current sensor abnormality determination unit 113 receives the current measurement signals $i^r_{ds1}$ and $i^r_{qs1}$ for D-axis and Q-axis control from the first rotor coordinate system transformation unit 111 and generates the current measurement values for D-axis and Q-axis control from the received current measurement signals $i^r_{ds1}$ and $i^r_{qs1}$ for D-axis and Q-axis control.

Further, the current sensor abnormality determination unit 113 receives the current measurement signals $i^r_{ds2}$ and $i^r_{qs2}$ for D-axis and Q-axis monitoring from the second rotor coordinate system transformation unit 112 and generates the current measurement values for D-axis and Q-axis monitoring from the received current measurement signals $i^r_{ds2}$ and $i^r_{qs2}$ for D-axis and Q-axis monitoring.

Next, when the current measurement value exceeds a preset threshold value by comparing the generated current measurement values for D-axis and Q-axis control with the current measurement values for D-axis and Q-axis monitoring, the current sensor abnormality determination unit 113 may determine that at least one of the current sensors included in the current sensor unit 130 (130a and 130b) for control and the current sensor unit 140 (140a and 140b) for monitoring is in a fault (abnormal) state and generate and output a sensor abnormal signal representing that at least one of the current sensors is in the fault (abnormal) state.

Meanwhile, the apparatus 100 for controlling a 3-phase brushless AC motor according to the related art may not perform a normal driving control of the BLAC motor 150 when at least one of the included current sensors is in the fault (abnormal) state.

Further, the sensor abnormal signal which is generated and output by the control unit 110 of the apparatus 100 for controlling a 3-phase brushless AC motor according to the related art may not confirm which sensor among the included current sensors is in the fault (abnormal) state. Therefore, only when the input and output of each sensor are checked to find out and replace the sensor in the fault (abnormal) state or replace all the sensors, the normal driving control of the BLAC motor 150 may be realized.

Further, the apparatus 100 for controlling a 3-phase brushless AC motor according to the related art may perform the normal driving control of the BLAC motor 150 when at least one of the included current sensors is in the fault (abnormal) state while the vehicle is driven and thus may not assist a steering force for a driver, thereby increasing a danger of accident.

When the current sensors used to determine the operation and control state of the BLAC motor used in the motor-driven electric driving system according to the related art are in a fault condition, the operation of the BLAC motor may not be controlled and thus the motor-driven electric driving system is also normally operated. When the motor-driven electric driving system is in a fault condition while a driver drives a vehicle, the operation to assist the steering force may not be assisted and thus the driver may be in danger of accident. Therefore, a need exists for a technology of normally operating the motor-driven electric driving system by controlling the operation of the BLAC motor even though the current sensor used to determine the operation and control state of the BLAC motor used in the motor-driven electric driving system is in a fault state.

SUMMARY

An embodiment of the present invention is directed to a method and an apparatus for controlling a 3-phase AC motor capable of guaranteeing a normal operation of a motor-driven electric driving system by controlling a 3-phase brushless AC motor by controlling V/F (ratio between sizes of voltage and frequency) even when a current sensor used to determine an operation and control state of the 3-phase brushless AC motor of the motor-driven electric driving system is in a fault condition.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

To achieve the above object, the present invention provides a method for controlling a 3-phase AC motor capable of guaranteeing a normal operation of a motor-driven electric driving system by controlling a 3-phase brushless AC motor by controlling V/F (ratio between sizes of voltage and frequency) even when a current sensor used to determine an operation and control state of the 3-phase brushless AC motor of the motor-driven electric driving system is in a fault condition.

In accordance with an embodiment of the present invention, a method for controlling a 3-phase AC motor includes: transforming a torque command signal of an upper control into a voltage command; generating a current measurement value for a current flowing in two phases of the 3-phase AC motor depending on the voltage command by using a current sensor; generating a current estimation value by using driving sensing information of the 3-phase AC motor depending on the voltage command; calculating a current estimation error by using the current measurement value and the current estimation value; comparing with a preset reference value by using the calculated current estimation error; and performing a state transition changing a driving control type of the 3-phase AC motor depending on the comparison result.

When the calculated current estimation error exceeds the reference value, the state transition may be transited from a vector control mode to a voltage/frequency (V/F) control mode and when the calculated current estimation error does not exceed the reference value, the state transition may be transited from the V/F control mode to the vector control mode.

The vector control mode may be performed by using only the current sensor.

The V/F control mode may be performed by using a voltage Equation, a rotor speed, and a torque command signal.

The voltage Equation may calculate a current command value using the torque command signal and a magnetic flux command and calculate a voltage command value using the calculated current command value.

The driving sensing information may include a stator coil temperature measured by using a stator coil temperature sensor and a rotor speed measured by using a rotor position speed sensor.

The torque command limiting value of the torque command signal may be limited to ½ and the torque command limiting value may be a value obtained by multiplying a maximum magnetic flux value by a ratio of a motor speed.

The two phases may be an A phase and a B phase.

The current sensor may be configured to include a first stator current sensor measuring a current of an A phase and a second stator current sensor measuring a current of a B phase.

The 3-phase motor may be a 3-phase brushless alternating current motor.

The current measurement value may be transformed into a DQ-axis rotation coordinate.

An apparatus for controlling a 3-phase AC motor includes: a current sensor configured to generate a current measurement value for a current flowing in two phases of a 3-phase AC motor depending on a voltage command by a torque command signal of an upper controller; a current estimation unit configured to generate a current estimation value using driving sensing information of the 3-phase AC motor depending on the voltage command and calculate a current estimation error by using the current measurement value and the current estimation value; a current sensor abnormality determination unit configured to compare with a preset reference value by using the calculated current estimation error; and a current sensor abnormality determination unit configured to compare with a preset reference value by using the calculated current estimation error.

The driving sensing information may include a stator coil temperature and a rotor speed and a stator coil temperature sensor measuring the stator coil temperature, and a rotor position speed sensor measuring the rotor speed.

The apparatus for controlling a 3-phase AC motor may further include: a rotor coordinate system transformation unit configured to transform the current measurement value into a DQ-axis rotation coordinate.

DETAILED DESCRIPTION

Figure 1:
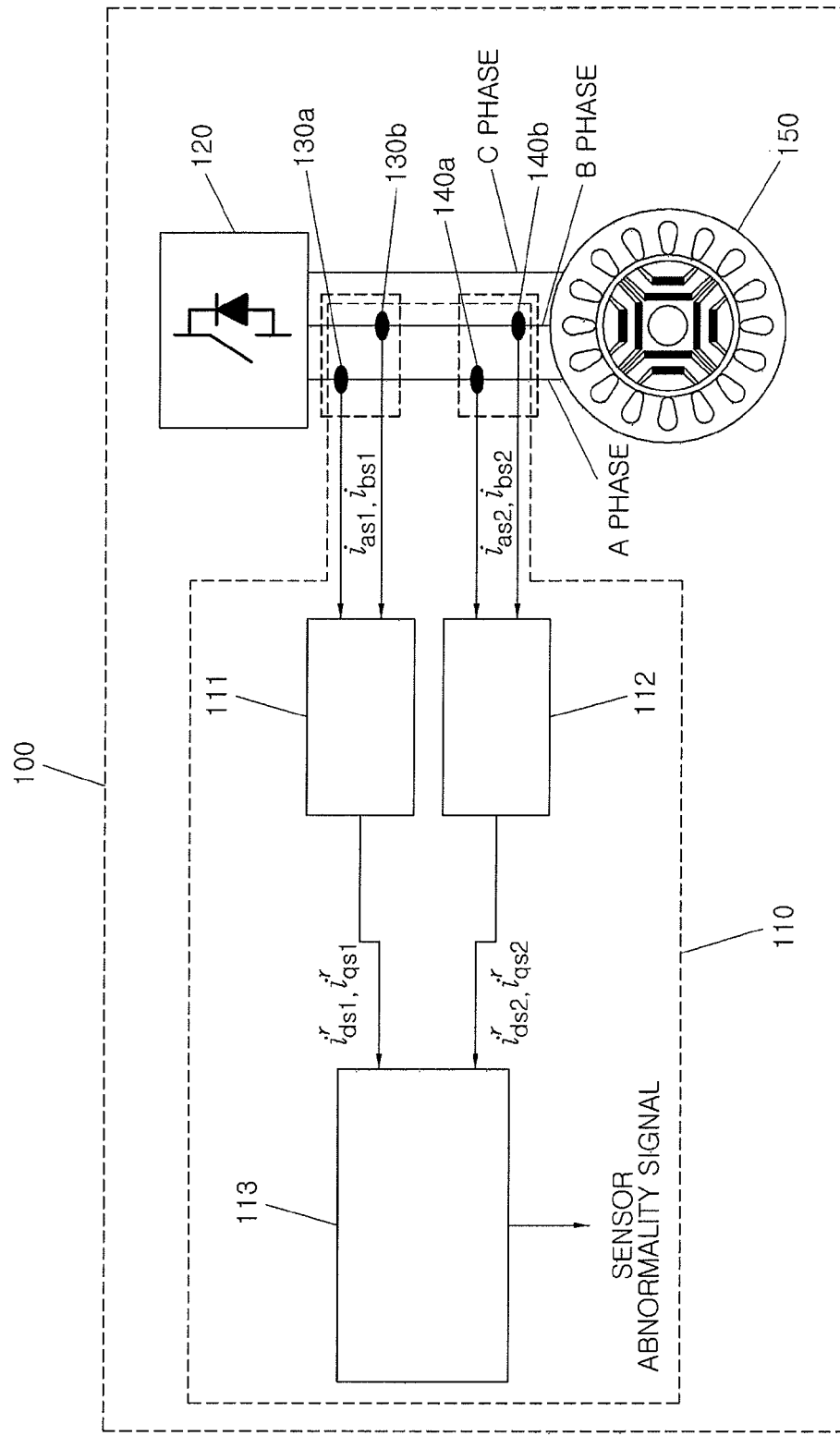
FIG. 1 is a schematic diagram illustrating an apparatus for controlling a 3-phase brushless AC motor according to the related art.

Hereinafter, exemplary embodiments of the present invention will be described in detail with reference to the accompanying drawings. However, the present invention will be not limited or restricted to the embodiments below. Like reference numerals proposed in each drawing denote like components.

Terms used in the specification, 'first', 'second', etc. can be used to describe various components, but the components are not to be construed as being limited to the terms. That is, the terms are used to distinguish one component from another component. For example, the 'first' component may be named the 'second' component and the 'second' component may also be similarly named the 'first' component, without departing from the scope of the present invention. Terms used in the present specification are used only in order to describe specific exemplary embodiments rather than limiting the present invention. Singular forms are intended to include plural forms unless the context clearly indicates otherwise.

Further, the terminologies used in the present invention are selected as general terminologies currently widely used in consideration of the configuration and functions of the present invention, but may be different depending on intention of those skilled in the art, a precedent, appearance of new technologies, and the like. Further, in specific cases, terms arbitrarily selected by an applicant are present. In this case, the detailed meaning of the terms will be described in the description of the present invention. Therefore, terms used in the present invention are defined based on a meaning of the terms and contents described in the present invention, not simply based on names of the terms.

Throughout the present specification, unless explicitly described to the contrary, "comprising" any components will be understood to imply the inclusion of other elements rather than the exclusion of any other elements. A term "unit", "module" or the like, described in the specification means a unit of processing at least one function or operation and may be implemented by hardware or software or a combination of hardware and software.

Hereinafter, the apparatus for controlling a 3-phase brushless AC motor of an environmentally friendly vehicle according to the embodiment of the present invention will be described with reference to the accompanying drawings.

Figure 2:
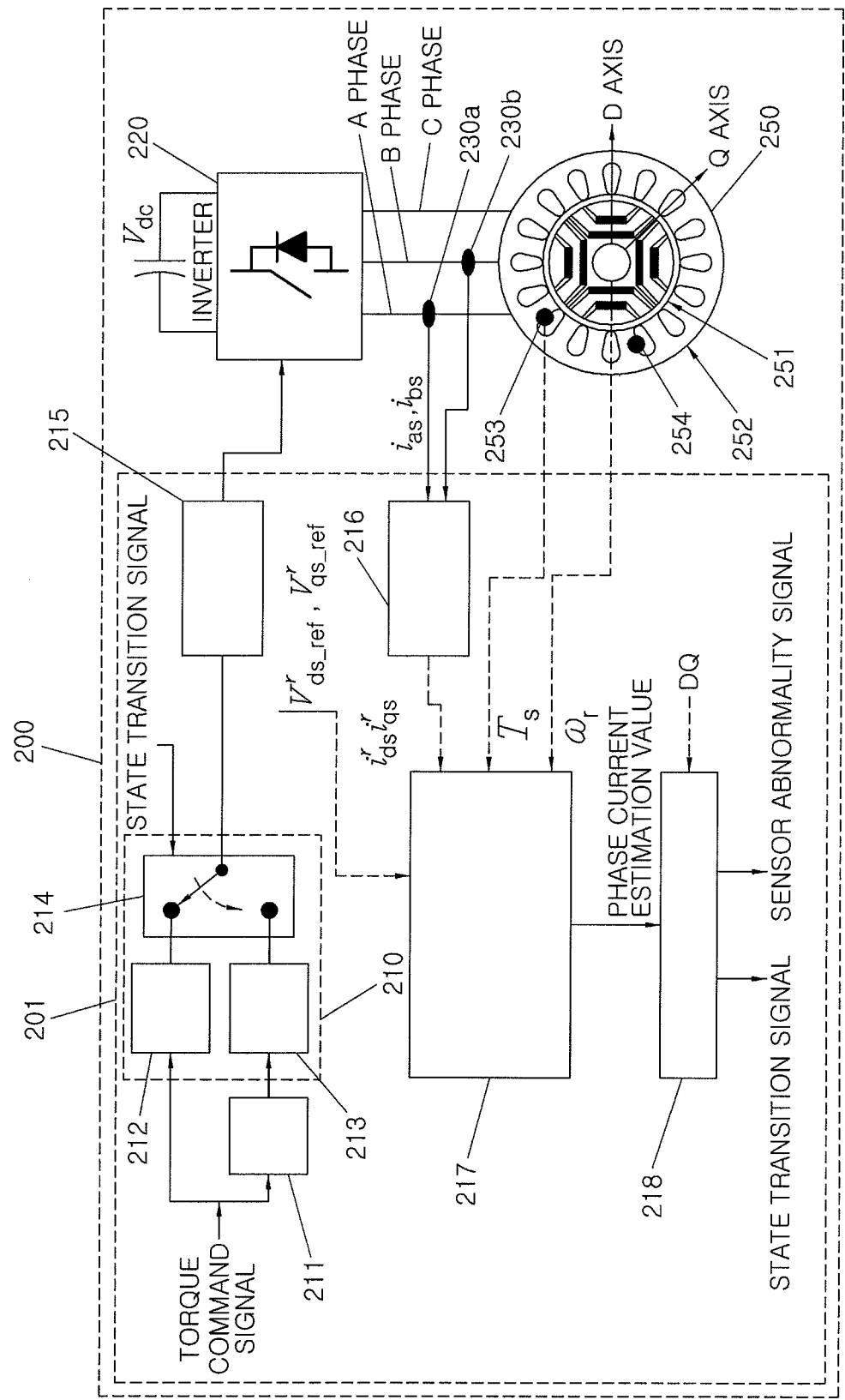
FIG. 2 is a schematic diagram illustrating an apparatus for controlling a 3-phase brushless AC motor of an environmentally friendly vehicle according to an embodiment of the present invention.

FIG. 2 is a schematic diagram illustrating an apparatus for controlling a 3-phase brushless AC motor of an environmentally friendly vehicle according to an embodiment of the present invention. Referring to FIG. 2, an apparatus 200 for controlling a 3-phase brushless AC motor of an environmentally friendly vehicle may include a micro control unit (MCU) 201, an inverter 220, an A-phase current sensor 230a, a B-phase current sensor 230b, and a 3-phase AC motor 250.

The MCU 201 may control an operation of the 3-phase AC motor 250 and/or the inverter 220.

The inverter 220 receives a PWM signal which is output from a pulse width modulation (PWM) generation unit 215 included in the MCU 201 and may control a driving of the 3-phase AC motor 250 depending on the received PWM signal.

The 3-phase AC motor 250 may be a 3-phase brushless AC motor.

The A-phase current sensor 230a may measure an A-phase current of a motor stator which is a current flowing in an A-phase line. The A-phase current sensor 230a may generate an A-phase current measurement signal $i_{as}$ of the stator representing an A-phase current value of the stator and transfer the generated A-phase current measurement signal $i_{as}$ of the stator to a rotor coordinate system transformation unit 216 of the MCU 201.

The B-phase current sensor 230b may measure a B-phase current of the motor stator which is a current flowing in a B-phase line. The B-phase current sensor 230b may generate a B-phase current measurement signal $i_{ab}$ of the stator representing a B-phase current value of the stator and transfer the generated B-phase current measurement signal $i_{ab}$ of the stator to the rotor coordinate system transformation unit 216 of the MCU 201.

The 3-phase AC motor 250 may be driven by controlling the inverter 220.

The MCU 201 may include a command limiting unit 211, a vector control unit 212, a V/F control unit 213, a switch 214, a PWM generation unit 214, the rotor coordinate system transformation unit 216, a current estimating unit 217, and a current sensor abnormality determination unit 218.

The command limiting unit 211 may receive a torque command signal from an upper controller of the MCU 201 of the apparatus 200 for controlling a 3-phase brushless AC motor of an environmentally friendly vehicle. The torque command signal may be a signal output from another ECU which is included in the environmentally friendly vehicle. For example, the torque command signal may be a signal which is output from the electric control unit (ECU) of an active geometry control suspension (AGCS).

Next, the command limiting unit 211 may limit the received torque command signal to ½. For example, the received torque command signal is a signal including a value determined depending on a speed of the environmentally friendly vehicle. Therefore, the command limiting unit 211 may extract a torque command value corresponding to the received torque command signal received from a pre-stored torque command table and generate a ½ value of the extracted torque command value to a torque command limiting value. The extracted torque command value may include an allowable torque value in consideration of safety in a current speed of the environmentally friendly vehicle. The command limiting unit 211 may calculate the torque command limiting value from the received torque command signal based on the following Equation 1.

$$T_{e\_lim\_half} = \frac{1}{2} T_{e\_lim}(\omega_r)$$ [Equation 1]

In the above Equation, $T_{e\_lim\_half}$ may be defined by the torque command limiting value, $T_{e\_lim}(\omega_r)$ may be defined by the torque value extracted from the allowable torque value extracted from the torque command table depending on the speed of the environmentally friendly vehicle, and co, may be defined by an electrical angular velocity of the rotor 251 of the 3-phase AC motor 250 and may be defined by rad/s in unit. $\omega_r$ may be obtained from the rotor speed sensor measurement signal which is measured and output by a rotor speed sensor 254 included in the 3-phase AC motor 250.

Next, the command limiting unit 211 may transfer a torque command limiting value signal representing the calculated torque command limiting value to the V/F control unit 213.

The vector control unit 212 may receive the torque command signal from an upper controller of the MCU 201 of the apparatus 200 for controlling a 3-phase brushless AC motor of an environmentally friendly vehicle and transform the received torque command signal into a vector control signal depending on a driving type of the 3-phase AC motor 250. The vector control unit 212 reflects the torque command signal and the rotor speed sensor measurement signal which is fed-back from the rotor speed sensor 254 included in the 3-phase AC motor 250 to be able to generate the vector control signal which may control the magnetic flux component and the torque component at the time of driving the 3-phase AC motor 250. When the vector control unit 212 is conducted with the PWM generation unit 215 through the switch 214, the vector control unit 212 may transfer the generated vector control signal to the PWM generation unit 215.

The V/F control unit 213 may receive the torque command limiting value signal from the command limiting unit 211 and calculate a magnetic flux command signal from the 3-phase AC motor 250. The V/F control unit 213 may calculate a V/F control signal for the torque command limiting value signal and the magnetic flux command signal based on a V/F control mode. When the V/F control unit 213 is conducted with the PWM generation unit 215 through the switch 214, the V/F control unit 212 may transfer the calculated V/F control signal to the PWM generation unit 215. The V/F control signal may include a D-axis current command signal which represents a D-axis current command value $i^r_{ds\_ref}$, a Q-axis current command signal which represents a Q-axis current command value $i^r_{qs\_ref}$, a D-axis voltage command signal which represents a D-axis voltage command value $V^r_{ds\_ref}$, and a Q-axis voltage command signal which represents a Q-axis voltage command value $V^r_{qs\_ref}$.

Herein, the vector control unit 212, the V/F control unit 213, and the switch 214 may be largely grouped into a state transition unit 210 which performs the state transition.

Figure 3:
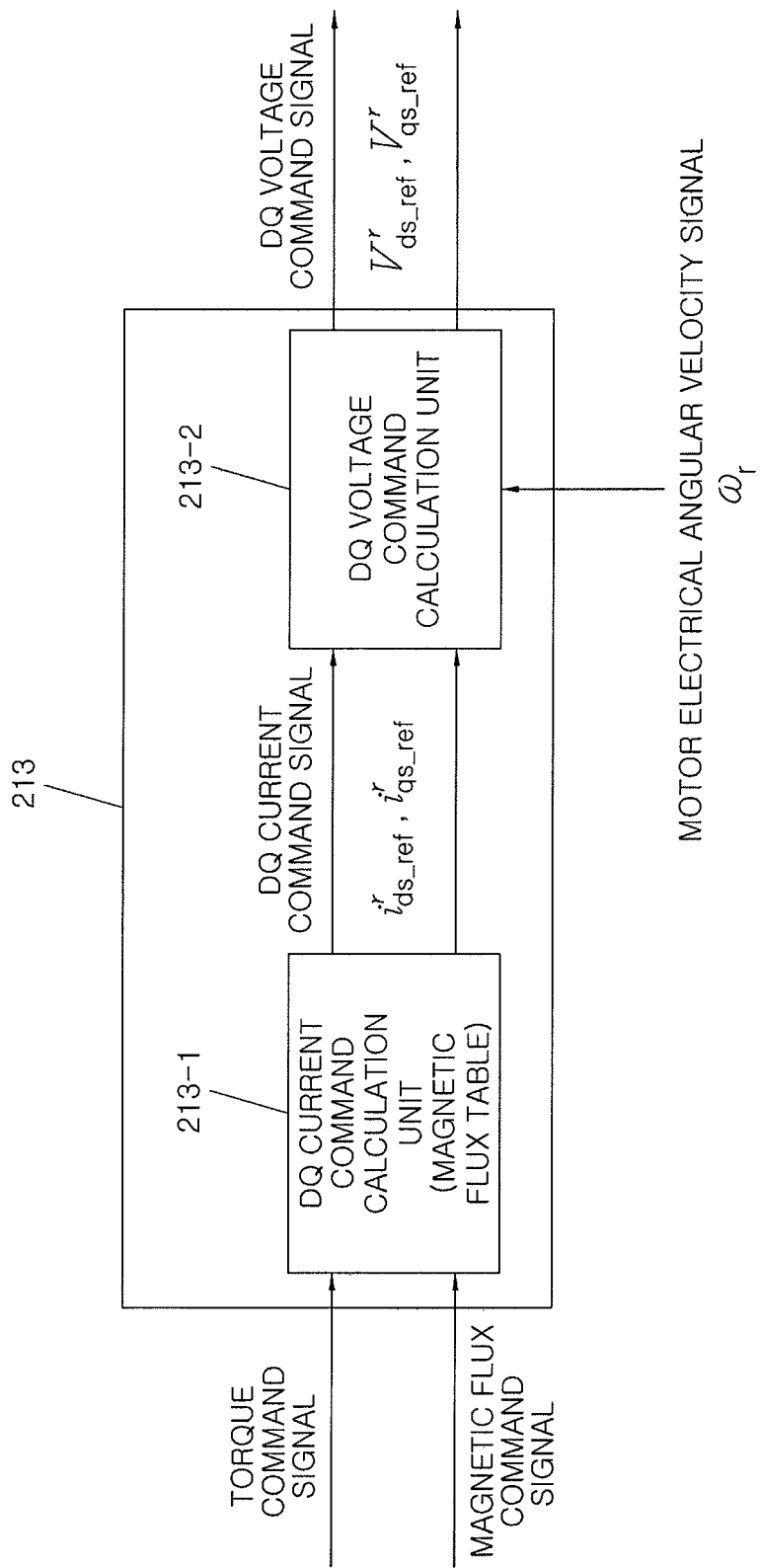
FIG. 3 is a block diagram illustrating a V/F control unit according to an embodiment of the present invention.
Figure 4:
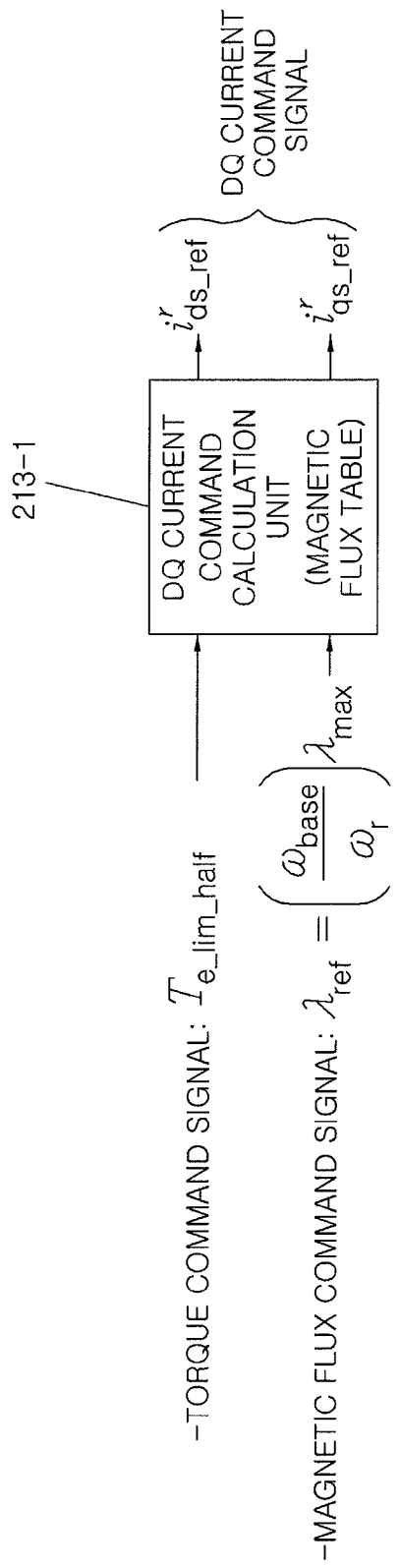
FIG. 4 is a block diagram illustrating a DQ current command calculation unit of the V/F control unit according to the embodiment of the present invention.
Figure 5:
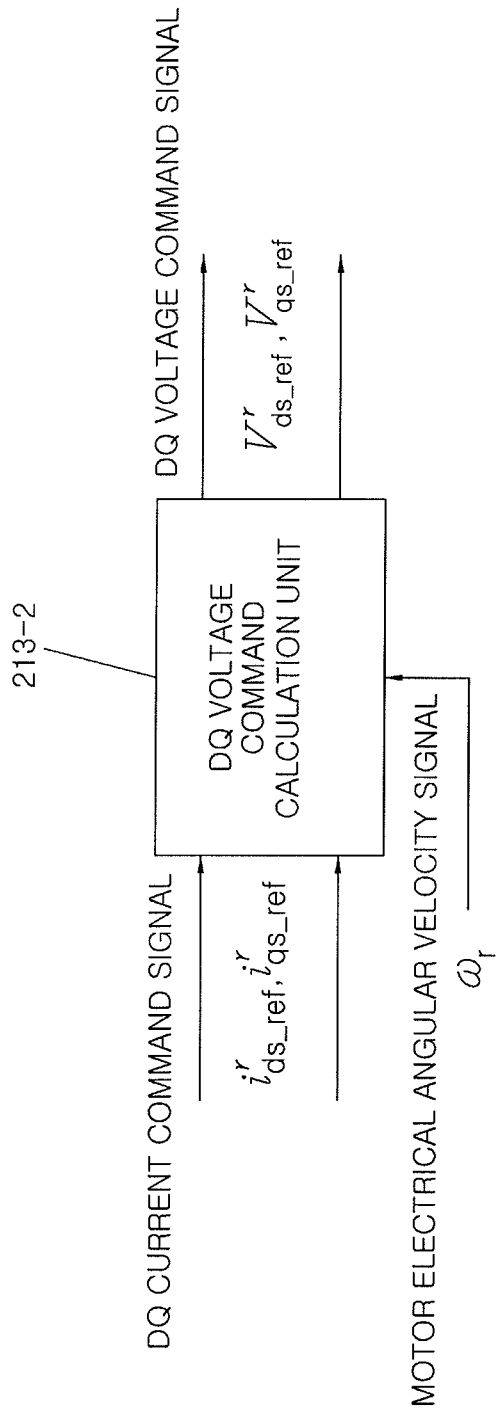
FIG. 5 is a block diagram illustrating a DQ voltage command calculation unit of the V/F control unit according to the embodiment of the present invention.

FIG. 3 is a block diagram illustrating a V/F control unit according to an embodiment of the present invention, FIG. 4 is a block diagram illustrating a DQ current command calculation unit of the V/F control unit according to the embodiment of the present invention, and FIG. 5 is a block diagram illustrating a DQ voltage command calculation unit of the V/F control unit according to the embodiment of the present invention. Referring to FIG. 3, the V/F control unit 213 may include a DQ current command calculation unit 213-1 and a DQ voltage command calculation unit 213-2.

The V/F control unit 213 may calculate the V/F control signal for the torque command limiting value signal received from the command limiting unit 211 and the magnetic flux command signal obtained from the 3-phase AC motor 250 based on the V/F control mode.

Referring to FIG. 4, the DQ current command calculation unit 213-1 may calculate the magnetic flux command value $\lambda_{ref}$ for the electrical angular velocity, a base speed, and a maximum magnetic flux value of the rotor 251 of the 3-phase AC motor 250, which are obtained from the rotor speed sensor 254 included in the 3-phase AC motor 250, based on the following Equation 2.

$$\lambda_{ref} = \left(\frac{\omega_{base}}{\omega_r}\right)\lambda_{max} \qquad \text{[Equation 2]}$$

In the above Equation 2, $\lambda_{ref}$ may be defined by the magnetic flux command value, $\omega_r$ may be defined by the electrical angular velocity of the rotor 251 of the 3-phase AC motor 250 and may be defined by rad/s in unit, $\omega_{base}$ may be defined by the base speed which is a boundary point speed between a maximum torque section and a maximum output section of the 3-phase AC motor 250 and may be rad/s in unit, and $\lambda_{max}$ may be defined by the maximum magnetic flux value. $T_{e\_lim\_half}$ illustrated in FIG. 4 means the torque command limiting value.

Next, the DQ current command calculation unit 213-1 may extract the calculated magnetic flux command value $\lambda_{ref}$ and the D-axis current command value $i^r_{ds\_ref}$ and the Q-axis current command value $i^r_{qs\_ref}$, which correspond to the torque command limiting value $T_{e\_lim\_half}$ received from the command limiting unit 211, from the pre-stored magnetic flux table.

Next, the DQ current command calculation unit 213-1 may generate the D-axis current command signal which represents the extracted D-axis current command value $i^r_{ds\_ref}$ and the Q-axis current command signal which represents the Q-axis current command value $i^r_{qs\_ref}$ and may transfer the generated D-axis current command signal and Q-axis current command signal to the DQ voltage command calculation unit 213-2.

Referring to FIG. 5, the DQ voltage command calculation unit 213-2 may receive the D-axis current command signal and the Q-axis current command signal from the DQ current command calculation unit 213-1 and may calculate the D-axis magnetic calculation value $\lambda^r_{ds\_ref}$ of the rotor coordinate system for the electrical angular velocity of the rotor 251 of the 3-phase AC motor 250 which is acquired from the rotor speed sensor 254 included in the 3-phase AC motor 250, a stator resistance value which reflects a coil temperature obtained from a stator coil temperature sensor 253 included in the 3-phase AC motor 250, a no-load counter electromotive force of the 3-phase AC motor 250, a D-axis inductance of the 3-phase AC motor 250, a Q-axis inductance of the 3-phase AC motor 250, a D-axis current command value of the rotor coordinate system, and a Q-axis current command value of the rotor coordinate system, based on the following Equation 3.

$$\lambda^r_{ds\_ref} = \lambda_{PM} + L_{ds} i^r_{ds\_ref} \qquad \text{[Equation 3]}$$

In the above Equation 3, $\lambda^r_{ds\_ref}$ may be defined by the D-axis magnetic flux calculation value (or, table output value using the D-axis current as an input) of the rotor coordinate system, $\lambda_{PM}$ may be defined by the magnetic flux generated from a magnet (no-load back electromotive force component, emf=$\lambda$PM$_\omega$), $L_{ds}$ may be defined by the motor D-axis inductance (or, table using a current as an input), and $i^r_{ds\_ref}$ may be defined by the D-axis current measurement value of the rotor coordinate system.

Further, the DQ voltage command calculation unit 213-2 may calculate the Q-axis magnetic flux calculation value of the rotor coordinate system based on the following Equation 4.

$$\lambda^r_{qs\_ref} = L_{qs} i^r_{qs\_ref} \qquad \text{[Equation 4]}$$

In the above Equation 4, $\lambda^r_{qs\_ref}$ may be defined by the Q-axis magnetic flux calculation value (or, table output value using the Q-axis current as an input) of the rotor coordinate system, $L_{qs}$ may be defined by the motor Q-axis inductance (or table using the Q-axis current as an input), and $i^r_{qs\_ref}$ may be defined by the Q-axis current measurement value of the rotor coordinate system.

Further, the DQ voltage command calculation unit 213-2 may calculate the D-axis voltage command value $V^r_{ds\_ref}$ based on the following Equation 5.

$$V^r_{ds\_ref} = R_s i^r_{ds\_ref} - \lambda^r_{qs\_ref} \omega_r \qquad \text{[Equation 5]}$$

In the above Equation 5, $V^r_{ds\_ref}$ may be defined by the D-axis voltage command of the rotor coordinate system, $R_s$ ($T_{coil}$) may be defined by the stator resistance value reflecting the coil temperature, $i^r_{ds\_ref}$ may be defined by the D-axis current measurement value of the rotor coordinate system, $\lambda^r_{qs\_ref}$ may be defined by the Q-axis magnetic flux calculation value (or, table output value using the Q-axis current as an input) of the rotor coordinate system, and $\omega_r$ may be defined by the rotor speed measurement value which is acquired from the rotor position/speed sensor.

Further, the DQ voltage command calculation unit 213-2 may calculate the Q-axis voltage command value $V^r_{qs\_ref}$ based on the following Equation 6.

$$V^r_{qs\_ref} = R_s i^r_{qs\_ref} - \lambda^r_{ds\_ref} \omega_r \qquad \text{[Equation 6]}$$

In the above Equation 6, $V^r_{qs\_ref}$ may be defined by the Q-axis voltage command of the rotor coordinate system, $R_s$ ($T_{coil}$) may be defined by the stator resistance value reflecting the coil temperature, $i^r_{qs\_ref}$ may be defined by the Q-axis current measurement value of the rotor coordinate system, $\lambda^r_{ds\_ref}$ may be defined by the D-axis magnetic flux calculation value (or, table output value using the D-axis current as an input) of the rotor coordinate system, and $\omega_r$ may be defined by the rotor speed measurement value which is acquired from the rotor position/speed sensor 254 (FIG. 2).

Next, the DQ voltage command calculation unit 213-2 may generate the D-axis voltage command signal which represents the calculated D-axis voltage command value $V^r_{ds\_ref}$ and the Q-axis voltage command signal which represents the calculated Q-axis voltage command value $V^r_{qs\_ref}$ and may transfer the generated D-axis voltage command signal and Q-axis voltage command signal to the V/F control unit 213. Therefore, when the V/F control unit 213 is conducted with the PWM generation unit 215 through the switch 214, the V/F control unit 212 may transfer the calculated V/F control signal to the PWM generation unit 215. The V/F control signal may include the D-axis current command signal and the D-axis current command signal which are generated from the DQ current command calculation unit 213-1 and may include the D-axis voltage command signal and the Q-axis voltage command signal which are generated from the DQ voltage command calculation unit 213-2.

The switch 214 may conduct between the MCU 201 and the PWM generation unit 215 depending on the control of the current sensor abnormality determination unit 218 or conduct between the V/F control unit 213 and the PWM generation unit 215. The switch 214 may include at least one of a single pole double throw (SPDT) and a solenoid.

When the PWM generation unit 215 is conducted with the MCU 201 through the switch 214, the PWM generation unit 215 may receive the vector control signal from the MCU 201 to generate the PWM signal and transfer the generated PWM signal to the inverter 220.

Further, when the PWM generation unit 215 is conducted with the V/F control unit 213 through the switch 214, the PWM generation unit 215 may receive the V/F control signal from the V/F control unit 213 to generate the PWM signal and transfer the generated PWM signal to the inverter 220.

The rotor coordinate system conversion unit 216 may receive the A-phase current measurement signal $i_{as}$ of the stator including the A-phase current measurement value of the stator from the A-phase current sensor 230a and the B-phase current measurement signal $i_{ab}$ of the stator including the B-phase current measurement value of the stator from the B-phase current sensor 230b to generate the D-axis current measurement signal of the rotor coordinate system including the D-axis current measurement value of the rotor coordinate system generated by performing the coordinate transformation on the received A-phase current measurement signal $i_{as}$ of the stator and B-phase current measurement signal $i_{ab}$ of the stator and transfer the generated D-axis current measurement signal of the rotor coordinate system to the current estimation unit 217.

Further, the rotor coordinate system conversion unit 216 may receive the A-phase current measurement signal $i_{as}$ of the stator including the A-phase current measurement value of the stator from the A-phase current sensor 230a and the B-phase current measurement signal $i_{ab}$ of the stator including the B-phase current measurement value of the stator from the B-phase current sensor 230b to generate the Q-axis current measurement signal of the rotor coordinate system including the Q-axis current measurement value of the rotor coordinate system generated by performing the coordinate transformation on the received A-phase current measurement signal $i_{as}$ of the stator and B-phase current measurement signal $i_{ab}$ of the stator and transfer the generated Q-axis current measurement signal of the rotor coordinate system to the current estimation unit 217.

Further, the rotor coordinate system transformation unit 216 may transfer the generated D-axis current measurement signal $i^r_{ds}$ and Q-axis current measurement signal $i^r_{qs}$ to the current sensor abnormality determination unit 218.

The current estimation unit 217 receives the D-axis current measurement signal $i^r_{ds}$ and the Q-axis current measurement signal $i^r_{qs}$ from the rotor coordinate system transformation unit 216 and may calculate the D-axis magnetic calculation value $\lambda^r_{ds}$ of the rotor coordinate system for the electrical angular velocity of the rotor 251 of the 3-phase AC motor 250 which is acquired from the rotor speed sensor 254 included in the 3-phase AC motor 250, a stator resistance value which reflects a coil temperature obtained from a stator coil temperature sensor 253 included in the 3-phase AC motor 250, a no-load counter electromotive force component of the 3-phase AC motor 250, a D-axis inductance of the 3-phase AC motor 250, a D-axis inductance of the 3-phase AC motor 250, a Q-axis inductance of the 3-phase AC motor 250, the D-axis current command value of the rotor coordinate system, and the Q-axis current command value of the rotor coordinate system, based on the following Equation 7.

$$\lambda^r_{ds} = \lambda_{PM} + L_{ds} i^r_{ds}$$ [Equation 7]

Further, the current estimation unit 217 may extract the D-axis magnetic flux calculation value $\lambda^r_{ds}$ of the rotor coordinate system from the pre-stored D-axis magnetic flux calculation value table so that the D-axis magnetic flux calculation value $\lambda^r_{ds}$ corresponds to the current value applied to the D axis of the 3-phase AC motor 250.

Further, the current estimation unit 217 may calculate the Q-axis magnetic flux calculation value $\lambda^r_{qs}$ of the rotor coordinate system based on the following Equation 8.

$$\lambda^r_{qs} = L_{qs} i^r_{qs}$$ [Equation 8]

Further, the current estimation unit 217 may extract the Q-axis magnetic flux calculation value $\lambda^r_{qs}$ of the rotor coordinate system from the pre-stored D-axis magnetic flux calculation value table so that the Q-axis magnetic flux calculation value $\lambda^r_{qs}$ corresponds to the current value applied to the Q axis of the 3-phase AC motor 250.

Further, the current estimation unit 217 may calculate a D-axis current estimation value $\hat{i}^r_{ds}$ of the rotor coordinate system based on the following Equation 9.

$$\hat{i}^r_{ds} = \frac{1}{L_{ds}} \int [V^r_{ds\_ref} - R_s(T_{coil}) \hat{i}^r_{ds} + \lambda^r_{qs} \omega_r] dt$$ [Equation 9]

In the above Equation 9, $\hat{i}^r_{ds}$, $1/L_{ds}$, $V^r_{ds\_ref}$ and $R_s(T_{coil})$ may be defined as $\lambda^r_{qs}$, and $\omega_r$.

Further, the current estimation unit 217 may extract the D-axis current estimation value $\hat{i}^r_{ds}$ from the pre-stored D-axis current estimation value table so that the D-axis current estimation value $\hat{i}^r_{ds}$ corresponds to the current value applied to the D axis of the 3-phase AC motor 250.

Further, the current estimation unit 217 may calculate a Q-axis current estimation value $\hat{i}^r_{qs}$ of the rotor coordinate system based on the following Equation 10.

$$\hat{i}^r_{qs} = \frac{1}{L_{qs}} \int [V^r_{qs\_ref} - R_s(T_{coil}) \hat{i}^r_{qs} + \lambda^r_{qs} \omega_r] dt$$ [Equation 10]

In the above Equation 10, $\hat{i}^r_{qs}$ may be defined by the D-axis current estimation value of the rotor coordinate value, $1/L_{qs}$ may be defined by a reciprocal number (or, table inputting the D-axis current) of the motor D-axis inductance, $V^r_{qs\_ref}$ may be defined by the Q-axis voltage command of the rotor coordinate system, $R_s(T_{coil})$ may be defined by the stator resistance value reflecting the coil temperature, and $\lambda^r_{ds}$ and $\omega_r$ may each be defined by the D-axis magnetic flux calculation value of the rotor coordinate value and the rotor speed measurement value (that is, electrical angular velocity (unit is rad/s) of the motor rotor) acquired from the rotor position/speed sensor.

Further, the current estimation unit 217 may extract the Q-axis current estimation value $\hat{i}^r_{qs}$ from the pre-stored Q-axis current estimation value table so that the Q-axis current estimation value $\hat{i}^r_{qs}$ corresponds to the current value applied to the Q axis of the 3-phase AC motor 250.

Next, the current estimation unit 217 may transfer the calculated D-axis current estimation value $\hat{i}^r_{ds}$ of the rotor coordinate system and the calculated Q-axis current estimation value $\hat{i}^r_{qs}$ of the rotor coordination system to the current sensor abnormality determination unit 218.

The current sensor abnormality determination unit 218 may calculate a D-axis current estimation error value $e_{id}$ of the rotor coordinate system for the D-axis current estimation value $\hat{i}^r_{ds}$ of the rotor coordinate system received from the current estimation unit 217 and the D-axis current measurement value $i^r_{ds}$ received from the rotor coordinate system transformation unit 216 based on the following Equation 11.

$$e_{id}=|i^r_{ds}-\hat{i}^r_{ds}| \qquad \text{[Equation 11]}$$

In the above Equation 11, $e_{id}$ may be defined by the Q-axis current estimation error of the rotor coordinate system, $i^r_{ds}$ may be defined by the D-axis current measurement value, and $\hat{i}^r_{ds}$ may be defined by the D-axis current estimation value of the rotor coordinate system. The current sensor abnormality determination unit 218 may calculate, as the $e_{id}$, an absolute value of a value obtained by subtracting $\hat{i}^r_{ds}$ from $i^r_{ds}$.

Further, the current sensor abnormality determination unit 218 may calculate a Q-axis current estimation error value $e_{iq}$ of the rotor coordinate system for the Q-axis current estimation value $\hat{i}^r_{qs}$ of the rotor coordinate system received from the current estimation unit 217 and the Q-axis current measurement value $i^r_{qs}$ received from the rotor coordinate system transformation unit 216 based on the following Equation 12.

$$e_{iq}=|i^r_{qs}-\hat{i}^r_{qs}| \qquad \text{[Equation 12]}$$

In the above Equation 12, $e_{iq}$ may be defined by the Q-axis estimation error of the rotor coordinate system, $i^r_{qs}$ may be defined by the D-axis current measurement value, and $\hat{i}^r_{qs}$ may be defined by the D-axis current estimation value of the rotor coordinate system. The current sensor abnormality determination unit 218 may calculate, as the $e_{iq}$, an absolute value of a value obtained by subtracting $\hat{i}^r_{qs}$ from $i^r_{qs}$.

Further, the current sensor abnormality determination unit 218 may generate the A-phase current measurement signal $i_{as}$ of the stator including the A-phase current measurement value of the stator from the A-phase current sensor 230a and the A-phase current measurement signal $i_{bs}$ of the stator including the A-phase current measurement value of the stator from the B-phase current sensor 230b. The A-phase current measurement value of the stator and the B-phase current measurement value of the stator are each equal to or less than 5% and each error of the calculated D-axis current estimation error value $e_{id}$ of the rotor coordinate value and the calculated Q-axis current estimation error value $e_{iq}$ of the rotor coordinate system is 5%. Therefore, when a deviation between the D-axis current measurement value $i^r_{ds}$ transformed by the rotor coordinate system transformation unit 216 and the calculated D-axis current estimation error value $e_{id}$ for the A-phase current measurement value of the stator exceeds 10%, the current sensor abnormality determination unit 218 may determine the state of the A-phase current sensor 230a as the fault (abnormal) state.

The current sensor abnormality determination unit 218 may determine the state of the A-phase current sensor 230a as the fault (abnormal) state based on the following Equation 13.

$$|i^r_{ds}-\hat{i}^r_{ds}|>\Delta Is_{th} \qquad \text{[Equation 13]}$$

In the above Equation 13, $i^r_{ds}$ may be defined by the D-axis current measurement value of the rotor coordinate system and $\Delta Is_{th}$ may be defined by a preset reference value of a current sensor fault determination. When the absolute value of the value obtained by subtracting $\hat{i}^r_{ds}$ from $i^r_{ds}$ exceeds $\Delta Is_{th}$, the current sensor abnormality determination unit 218 may determine the state of the A-phase current sensor 230a as the fault (abnormal) state.

Further, when a deviation between the Q-axis current measurement value $i^r_{qs}$ transformed by the rotor coordinate system transformation unit 216 and the calculated Q-axis current estimation error value $e_{iq}$ for the B-phase current measurement value of the stator exceeds 10%, the current sensor abnormality determination unit 218 may determine the state of the B-phase current sensor 230b as the fault (abnormal) state. When the current sensor abnormality determination unit 218 determines the state of the A-phase current sensor 230a as the fault (abnormal) state, the current sensor abnormality determination unit 218 may transfer the sensor abnormality signal representing the fault state of the A-phase current sensor 230a to the state transition unit 210.

Further, the current sensor abnormality determination unit 218 may output the fault state of the A-phase current sensor 230a by a display unit (not illustrated) such as a lamp mounted in the environmentally friendly vehicle, a display device, and a speaker and by at least one method of a lighting of a lamp, a text message, and a voice message in order for the driver to recognize the fault state of the A-phase current sensor 230a.

The current sensor abnormality determination unit 218 may determine the state of the B-phase current sensor 230b as the fault (abnormal) state based on the following Equation 14.

$$|i^r_{qs}-\hat{i}^r_{qs}|>\Delta Is_{th} \qquad \text{[Equation 14]}$$

In the above Equation 14, $i^r_{qs}$ may be defined by the Q-axis current measurement value of the rotor coordinate system and $\Delta Is_{th}$ may be defined by the preset reference value of the current sensor fault determination. When the absolute value of the value obtained by subtracting $\hat{i}^r_{qs}|$ from $i^r_{qs}$ exceeds $\Delta Is_{th}$, the current sensor abnormality determination unit 218 may determine the state of the B-phase current sensor 230b as the fault (abnormal) state. When the current sensor abnormality determination unit 218 determines the state of the B-phase current sensor 230b as the fault (abnormal) state, the current sensor abnormality determination unit 218 may generate the sensor abnormality signal representing the fault state of the B-phase current sensor 230b and transfer the generated sensor abnormality signal to the state transition unit 210.

Further, the current sensor abnormality determination unit 218 may output the fault state of the B-phase current sensor 230b by a display unit (not illustrated) such as a lamp mounted in the environmentally friendly vehicle, a display device, and a speaker and by at least one method of a lighting of a lamp, a text message, and a voice message in order for the driver to recognize the fault state of the B-phase current sensor 230b.

The current sensor abnormality determination unit 218 may transit the state of the driving control method of the 3-phase AC motor 250 to the vector control mode or the V/F control mode depending to the received sensor abnormality signal.

Figure 7:
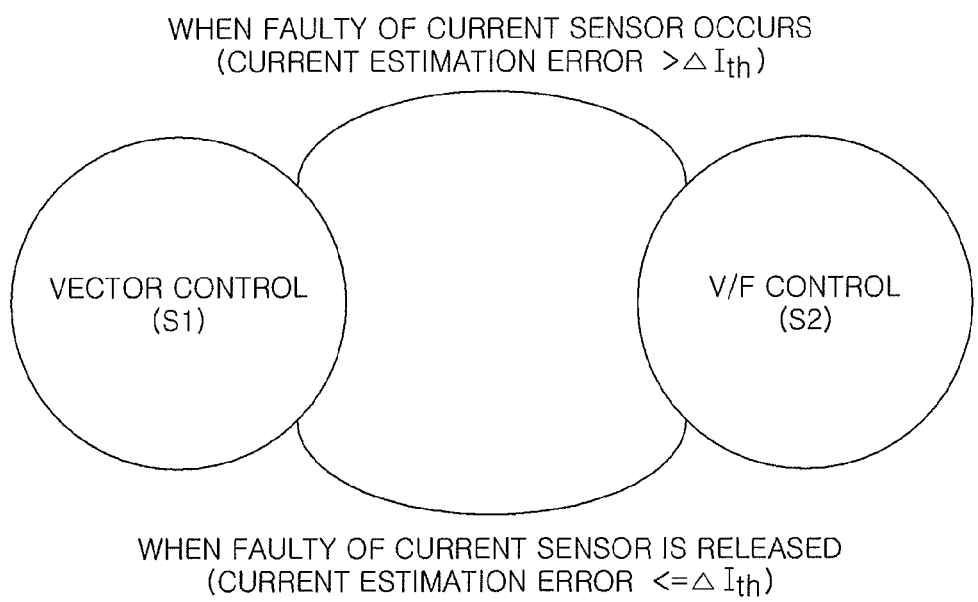
FIG. 7 is a flow chart illustrating a state transition of the operation of a method for controlling a 3-phase AC motor according to an embodiment of the present invention.

FIG. 7 is a diagram schematically illustrating a state transition of the operation of a method for controlling a 3-phase AC motor according to an embodiment of the present invention. Referring to FIG. 7, when the sensor abnormality signal is generated, the current sensor abnormality determination unit 218 may generate the state transition signal controlling the operation of the switch 214 to transform the driving operation of the 3-phase AC motor 250 from the existing vector control mode into the V/F control mode. The current sensor abnormality determination unit 218 may transfer the generated state transition signal to the switch 214. The switch 214 may short-circuit between the vector MCU 201 and the PWM generation unit 215 or conduct between the V/F control unit 213 and the PWM generation unit 215 depending on the state transition signal received from the current sensor abnormality determination unit 218.

Further, when the state of the A-phase current sensor 230a or the B-phase current sensor 230b in the fault state is in the normal state by replacing or repairing the sensor, the current sensor abnormality determination unit 218 may generate the state transition signal controlling the operation of the switch 214 to transform the driving operation of the 3-phase AC motor 250 from the V/F control mode into the existing vector control mode. The switch 214 may short-circuit between the V/F control unit 213 and the PWM generation unit 215 or conduct between the vector MCU 201 and the PWM generation unit 215 depending on the state transition signal received from the current sensor abnormality determination unit 218.

Meanwhile, each component of the apparatus 200 for controlling a 3-phase brushless AC motor of an environmentally friendly vehicle are illustrated in different drawings to illustrate that they may be functionally and logically separated and does not mean that they are not physically necessarily implemented as separate components or are implemented as separate codes.

Further, in the present specification, each function unit may mean hardware to perform the technical idea of the present invention and a functional and structural coupling of software to run the hardware. For example, each of the function units may mean a predetermined code and a logical unit of a hardware resource to run the predetermined code or the fact that each of the function units does not necessarily mean the physically connected code and one kind of hardware may be easily inferred by a person having ordinary skill in the art to which the present invention pertains.

The method for controlling a 3-phase AC motor according to the embodiment of the present invention will be described with reference to the accompanying drawings.

Figure 6:
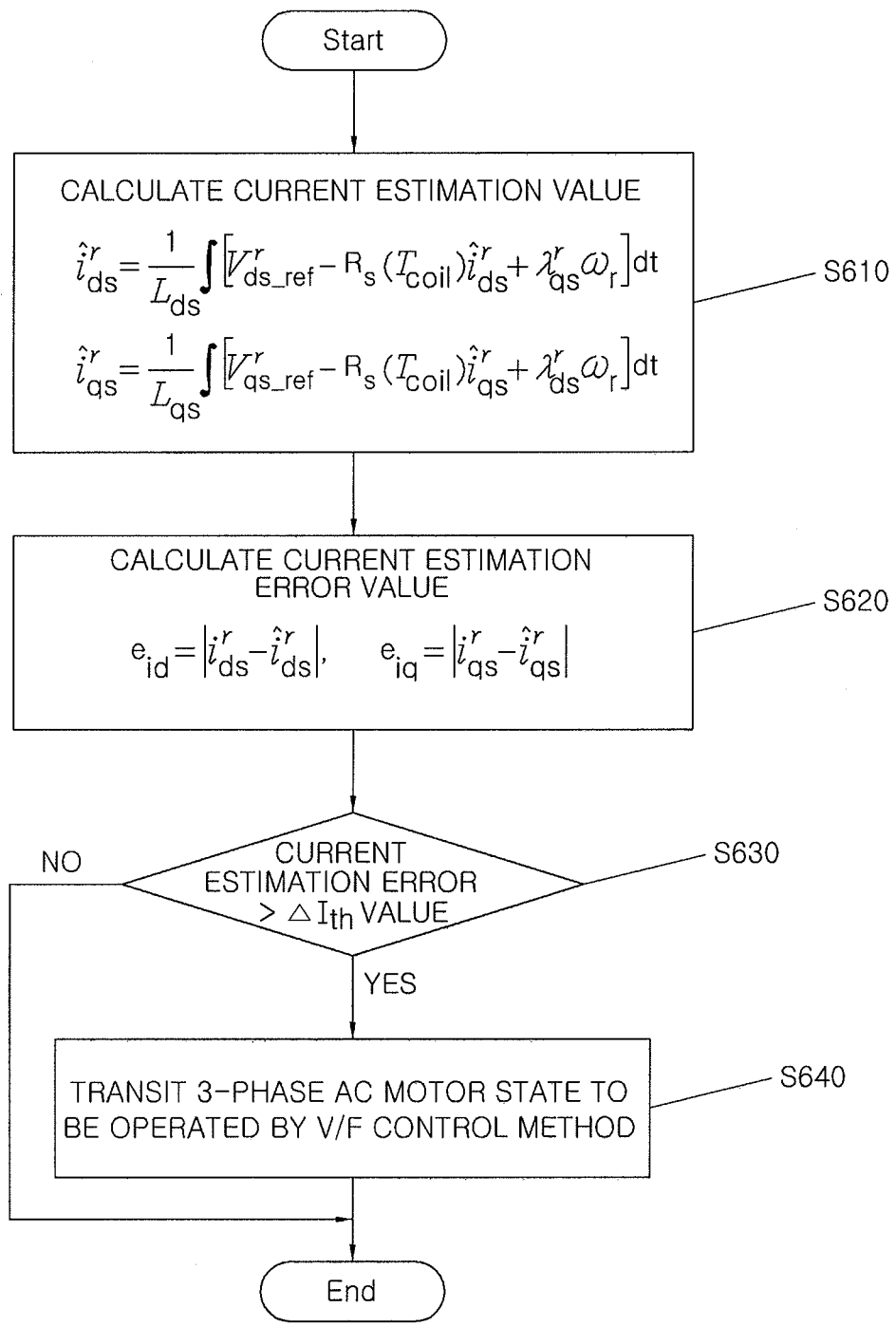
FIG. 6 is a flow chart illustrating an operation of a method for controlling a 3-phase AC motor according to an embodiment of the present invention.

FIG. 6 is a flow chart illustrating an operation of a method for controlling a 3-phase AC motor according to an embodiment of the present invention. Referring to FIG. 6, the torque command signal of the upper controller (not illustrated) is transformed into the voltage command and the current measurement value for a current flowing in 2 phases of the 3-phase AC motor depending on the voltage command is generated by using the current sensors 230a and 230b (FIG. 2). At the same time, the current estimation value is generated by using the driving sensing information of the 3-phase AC motor depending on the voltage command (step S610). In other words, the current estimation value means the DQ-axis current estimation value which is calculated by using the DQ-axis voltage command $V_{ds\_ref}$ and $V_{qs\_ref}$, the stator coil temperature $T_{coil}$, the rotor speed measurement value $\omega_r$, magnetic fluxes $\lambda^r_{ds}$ and $\lambda^r_{qs}$ measured offline, and the like.

When the current measurement value and the current estimation value are calculated, the current estimation error is calculated as the absolute value which is the value obtained by subtracting the current estimation value from the current measurement value (step S620).

The calculated current estimation errors $e_{id}$ and $e_{dq}$ compares with a preset reference value $\Delta I_{th}$ (step S630).

As the comparison result, when the current estimation error value is larger than the reference value, the state transition from the vector control mode to the voltage/frequency (V/F) control mode is performed (step S640). In other words, when the current estimation errors $e_{id}$ and $e_{dq}$ are larger than the preset reference value $\Delta I_{th}$, the state of the current sensors 230a and 230b (FIG. 2) is determined as the fault state and the vector control mode which is a current operation control mode is transited to the V/F control mode and the control to make the operation of the 3-phase AC motor 250 (FIG. 2) normally be operated is performed. In other words, even though the current sensor is in the fault state, the operation of the 3-phase AC motor is normally performed.

Unlike this, when the current estimation errors $e_{id}$ and $e_{dq}$ calculated in step S630 are smaller than the preset reference value $\Delta I_{th}$, the vector control is performed.

FIG. 7 is a diagram schematically illustrating a state transition of the operation of a method for controlling a 3-phase motor according to an embodiment of the present invention. Referring to FIG. 7, when the current sensor is in the fault state (that is, when the current estimation error value is larger than the reference value), the transition from the vector control mode to the V/F control mode is performed.

Unlike this, when the faulty of the current sensor is released (that is, when the current estimation error value is smaller than the reference value), the transition from the V/F control mode to the vector control mode is performed.

In the state in which the vector control mode performs the vector control using only the current sensor, the abnormality of the current sensor is sensed by comparing the current estimation value with the current measurement value.

Unlike this, the V/F control mode performs the V/F control by using a voltage equation, a motor speed, a torque command value, and the like.

According to the embodiments of the present invention, it is possible to control the 3-phase brushless AC motor by determining whether the current sensor used to determine the operation and control state of the 3-phase brushless AC motor of the environmentally friendly vehicle is in the fault condition and as the determination result, it is determined that the current sensor is in the fault condition, controlling the V/F (ratio between the sizes of the voltage and the frequency).

Further, according to the embodiments of the present invention, it is possible to reduce the number of current sensors of the related art used to determine the operation and control state of the 3-phase brushless AC motor of the environmentally friendly vehicle in half.

Further, according to the embodiments of the present invention, it is possible to save the production costs by reducing the number of current sensors of the related art which is used to determine the operation and control state of the 3-phase brushless AC motor of the environmentally friendly vehicle and guarantee the normal operation of the 3-phase brushless AC motor by controlling the V/F even when the current sensor is in the fault condition.

As described above, the present invention is described with reference to specific matters such as the detailed components and the limited exemplary embodiments, but is provided to help a general understanding of the present invention. Therefore, the present invention is not limited to the above exemplary embodiments and can be variously changed and modified from the description by a person skilled in the art to which the present invention pertain.

Therefore, the spirit of the present invention should not be limited to the above-described exemplary embodiments, and the following claims as well as all modified equally or equivalently to the claims are intended to fall within the scope and spirit of the invention.

What is claimed is:

1. A method of operating a 3-phase AC motor, comprising:
   transforming a torque command signal for operating the 3-phase AC motor into a voltage command;
   measuring, using at least one current sensor, a current flowing in at least one phase of the 3-phase AC motor operating in response to the voltage command;
   calculating a current estimation value using operation information acquired from at least one sensor other than the current sensor;
   calculating a current estimation error using the current estimation value and the current measured by the at least one current sensor;
   comparing the calculated current estimation error with a preset reference value; and
   changing a driving control mode of the 3-phase AC motor to another driving control mode based on the comparison result
   wherein when the calculated current estimation error exceeds the preset reference value, the driving control mode transitions from a vector control mode to a voltage/frequency (V/F) control mode.

2. The method of claim 1, wherein when the calculated current estimation error does not exceed the preset reference value, the driving control mode transitions from the V/F control mode to the vector control mode.

3. A method of operating a 3-phase AC motor, the method comprising:
   transforming a torque command signal for operating the 3-phase AC motor into a voltage command;
   measuring, using at least one current sensor, a current flowing in at least one phase of the 3-phase AC motor operating in response to the voltage command to acquire a current measurement value of the at least one phase;
   calculating a current estimation value using operation information acquired from at least one sensor other than the current sensor of the 3-phase AC motor operating in response to the voltage command;
   calculating a current estimation error using the current measurement value and the current estimation value;
   comparing the calculated current estimation error with a preset reference value; and
   changing a driving control mode of the 3-phase AC motor to another driving control mode based on the comparison result,
   wherein when the calculated current estimation error exceeds the preset reference value, the driving control mode is transitioned from a vector control mode to a voltage/frequency (V/F) control mode, and wherein when the calculated current estimation error does not exceed the preset reference value, the driving control mode is transitioned from the V/F control mode to the vector control mode.

4. The method of claim 3, wherein the vector control mode is performed by using only the current sensor.

5. The method of claim 3, wherein the V/F control mode is performed by using a voltage Equation, a rotor speed, and a torque command signal.

6. The method of claim 5, wherein the voltage equation calculates a current command value using the torque command signal and a magnetic flux command and calculates a voltage command value using the calculated current command value.

7. The method of claim 3, wherein the operation information includes a stator coil temperature measured by using a stator coil temperature sensor and a rotor speed measured by using a rotor position speed sensor.

8. The method of claim 7, wherein a torque command limiting value of the torque command signal is limited to ½ and the torque command limiting value is a value obtained by multiplying a maximum magnetic flux value by a ratio of a motor speed.

9. The method of claim 3, wherein the at least one phase comprises an A phase and a B phase.

10. The method of claim 9, wherein the at least one current sensor includes a first stator current sensor measuring a current of an A phase and a second stator current sensor measuring a current of a B phase.

11. The method of claim 3, wherein the 3-phase motor is a 3-phase brushless alternating current motor.

12. The method of claim 3, wherein the current measurement value is transformed into a DQ-axis rotation coordinate.

13. An apparatus for controlling a 3-phase AC motor comprising:
   a current sensor configured to generate a current measurement value for a current flowing in two phases of a 3-phase AC motor which is configured to operate in response to a voltage command by a torque command signal of an upper controller;
   a current estimation unit configured to generate a current estimation value using operation information of the 3-phase AC motor and calculate a current estimation error by using the current measurement value and the current estimation value;
   a current sensor abnormality determination unit configured to compare the calculated current estimation error with a preset reference value; and
   a state transition unit configured to change a driving control mode of the 3-phase AC motor based on the comparison result,
   wherein when the calculated current estimation error exceeds the preset reference value, the driving control mode is transitioned from a vector control mode to a voltage/frequency (V/F) control mode, and wherein when the calculated current estimation error does not exceed the preset reference value, the driving control mode is transitioned from the V/F control mode to the vector control mode.

14. The apparatus of claim 13, wherein the vector control mode is performed by using only the current sensor.

15. The apparatus of claim 13, wherein the V/F control mode is performed by using a voltage equation, a rotor speed, and a torque command signal.

16. The apparatus of claim 15, wherein the voltage equation calculates a current command value using the torque command signal and a magnetic flux command and calculates a voltage command value using the calculated current command value.

17. The apparatus of claim 13, wherein the operation information includes a stator coil temperature and a rotor speed and a stator coil temperature sensor measuring the stator coil temperature, and a rotor position speed sensor measuring the rotor speed.

18. The apparatus of claim 13, wherein the two phases are an A phase and a B phase.

19. The apparatus of claim 18, wherein the current sensor is configured to include a first stator current sensor measuring a current of an A phase and a second stator current sensor measuring a current of a B phase.

20. The apparatus of claim 13, further comprising:
a rotor coordinate system transformation unit configured to transform the current measurement value into a DQ-axis rotation coordinate.

* * * * *